US 6,619,193 B2

(12) United States Patent
Hinton et al.

(10) Patent No.: US 6,619,193 B2
(45) Date of Patent: Sep. 16, 2003

(54) SECTIONAL BAKING PANS

(76) Inventors: Deborah A. Hinton, 10944 Frisco La., Jacksonville, FL (US) 32257; Theresa Maria Montague, 1415 Oak High Ct., Orange City, FL (US) 32763; Colleen Frances Lassiter, 1185 Freedom La., Winter Springs, FL (US) 32708

( * ) Notice: Subject to any disclaimer, the term of this patent is extended or adjusted under 35 U.S.C. 154(b) by 0 days.

(21) Appl. No.: 10/138,573

(22) Filed: May 6, 2002

(65) Prior Publication Data

US 2002/0166459 A1 Nov. 14, 2002

Related U.S. Application Data

(60) Provisional application No. 60/290,021, filed on May 11, 2001.

(51) Int. Cl.[7] .............................. A23L 1/00; A47J 37/00; A47J 43/18; A45C 11/20; A45F 5/00
(52) U.S. Cl. .............................. 99/426; 99/428; 99/467; 99/483; 206/545; 206/549
(58) Field of Search .......................... 99/426–442, 448, 99/467, 483, DIG. 14; 206/545, 549, 514, 518, 519, 499, 548; 220/23.2, 23.6, 23.8, 608, 645, 659; 312/236; 229/406; 294/31.2, 149, 150, 161; 249/205, 119, 120, 133, 135, 122, 124, 53 R, DIG. 1; D7/553.3, 357; D9/341; 426/383, 243, 87, 515, 104, 107

(56) References Cited

U.S. PATENT DOCUMENTS

| | | | |
|---|---|---|---|
| 42,535 A * | 4/1864 | Jackson ................... 206/545 X |
| 191,578 A | 6/1877 | Foss |
| 1,511,265 A | 10/1924 | Chilson |
| 2,037,821 A | 4/1936 | Prabell |
| D112,254 S | 11/1938 | Jackson |
| 2,188,492 A | 1/1940 | Young |
| 2,598,995 A * | 6/1952 | Graff ....................... 206/549 X |
| 3,332,571 A | 7/1967 | Leedy |
| D215,957 S | 11/1969 | De Palmo |
| 3,485,434 A | 12/1969 | Donovan et al. |
| 3,633,786 A | 1/1972 | Leedy |
| 3,831,507 A * | 8/1974 | Wheaton ..................... 99/428 |
| 3,982,655 A | 9/1976 | Kaupert |
| 4,195,747 A | 4/1980 | Hare ......................... 220/23.2 |
| D257,116 S | 9/1980 | Lakatos et al. |
| 4,452,419 A | 6/1984 | Saleeba |
| 4,537,313 A * | 8/1985 | Workman .................... 206/545 |
| 4,694,961 A * | 9/1987 | Menendez ............. 294/149 X |
| 4,876,428 A | 10/1989 | Petcavich |
| 4,941,585 A * | 7/1990 | Hare et al. ................. 220/23.2 |
| 5,191,830 A * | 3/1993 | Jacobson ..................... 99/439 |
| 5,361,687 A * | 11/1994 | DeVries ...................... 99/426 |
| 5,501,338 A * | 3/1996 | Preston ...................... 206/545 |
| D369,508 S | 5/1996 | Jones et al. |
| 5,842,571 A * | 12/1998 | Rausch ....................... 206/549 |
| D427,009 S | 6/2000 | Lyengar et al. |
| 6,231,910 B1 * | 5/2001 | Ellingsworth ............. 99/426 X |
| 6,431,059 B1 * | 8/2002 | Castellani ..................... 99/440 |

* cited by examiner

Primary Examiner—Timothy F. Simone
(74) Attorney, Agent, or Firm—Richard C. Litman

(57) ABSTRACT

An improved baking pan kit which includes a baking pan for brownies having twenty square cups disposed in a matrix of five rows and four columns, and a cookie pan having preferably twelve circular cup configurations. Each of the pans in the kit is configured to have a predetermined heat depth and a convective heat transfer separation distance between respective cups to effect uniform heating of the respective cups containing a cookie and/or a brownie mixture for producing a specific product consistency or outcome. A multilevel storage compartment is used to house a plurality of pans for transport and deployment at various sites for use.

18 Claims, 4 Drawing Sheets

SECTIONAL BAKING PANS

CROSS-REFERENCE TO RELATED APPLICATION

This application claims the benefit of U.S. Provisional Patent Application Ser. No. 60/290,021, filed May 11, 2001.

BACKGROUND OF THE INVENTION

1. Field of the Invention

The present invention relates generally to baking pans. More specifically, the invention is an improved sectional baking pan kit for baking brownies and/or cookies.

2. Description of Related Art

Numerous baking pans have been devised for cooking batter-based baking goods, such as brownies, cup cakes, gingerbread cookies, etc. As disclosed in U.S. Pat. No. 4,876,428, issued to Petcavich, one recent form of baking utensil include pans which are transparent to microwave energy and which are used to bake both frozen and non-frozen batter-based goods. However, microwaved food items arguably do not provide the quality of baked goods produced the old-fashioned way with conventional gas or electric ovens. Other conventional baking pans disclose ornamental and structural features which are design-specific for producing a certain shape of baked goods, rather than being time-specific for producing baked goods according to a specific consistency or quality in a reduced amount of time. Most of these conventional features are described in the following patents by Foss (U.S. Pat. No. 191,578), Prabell (U.S. Pat. No. 2,037,821), Young (U.S. Pat. No. 2,188,492), Leedy (U.S. Pat. No. 3,633,786), Jackson (Des. 112,254), DePalmo (Des.215,957), Lakatos et al. (Des. 257,116) and Jones et al. (Des. 369,508) which specifically note the use of special circular contours, including angles of the cups, for distributing or conducting heat.

Other conventional features are described in the following patents by Chilson (U.S. Pat. No. 1,511,265), Leedy (U.S. Pat. No. 3,332,571), Donovan et al. (U.S. Pat. No. 3,485,434), Kaupert (U.S. Pat. No. 3,982,655), Saleeba (U.S. Pat. No. 4,452,419) and Lyengar et al. (Des. 427,009) which describe rectangular or nested rectangular contours designed to provide baked goods having a specific shape, but do not teach efficiently distributing heat across a sectional baking pan by utilizing a heating depth and convective heat transfer separation distance as will be described herein.

None of the above inventions and patents, taken either singly or in combination, is seen to describe the instant invention as claimed.

SUMMARY OF THE INVENTION

The improved sectional baking pan kit according to the invention includes a baking pan for brownies having twenty square cups disposed in a matrix of five rows and four columns, and a cookie pan having preferably twelve circular cup configurations. Each pan in the kit is configured to have a predetermined heat depth and a convective heat transfer separation distance between respective cups to effect uniform heating of the cookies and brownies for a specific product consistency or outcome.

Accordingly, it is a principal object of the invention to provide a sectional baking pan kit for selectively baking brownies and cookies.

It is another object of the invention to provide a sectional baking pan kit utilizing cups with predetermined heat depths and convective heat separation distances.

It is a further object of the invention to provide a sectional baking pan kit which includes storage and transport capability.

Still another object of the invention is to provide a sectional baking pan kit which allows for both cold and hot brownie and cookie transport to and from various delivery locations.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an improved sectional baking pan kit for effectively and efficiently baking brownies and/or cookies G. The preferred embodiment of the kit is depicted in FIG. 4, and is generally referenced by numeral 5.

Figure 1:
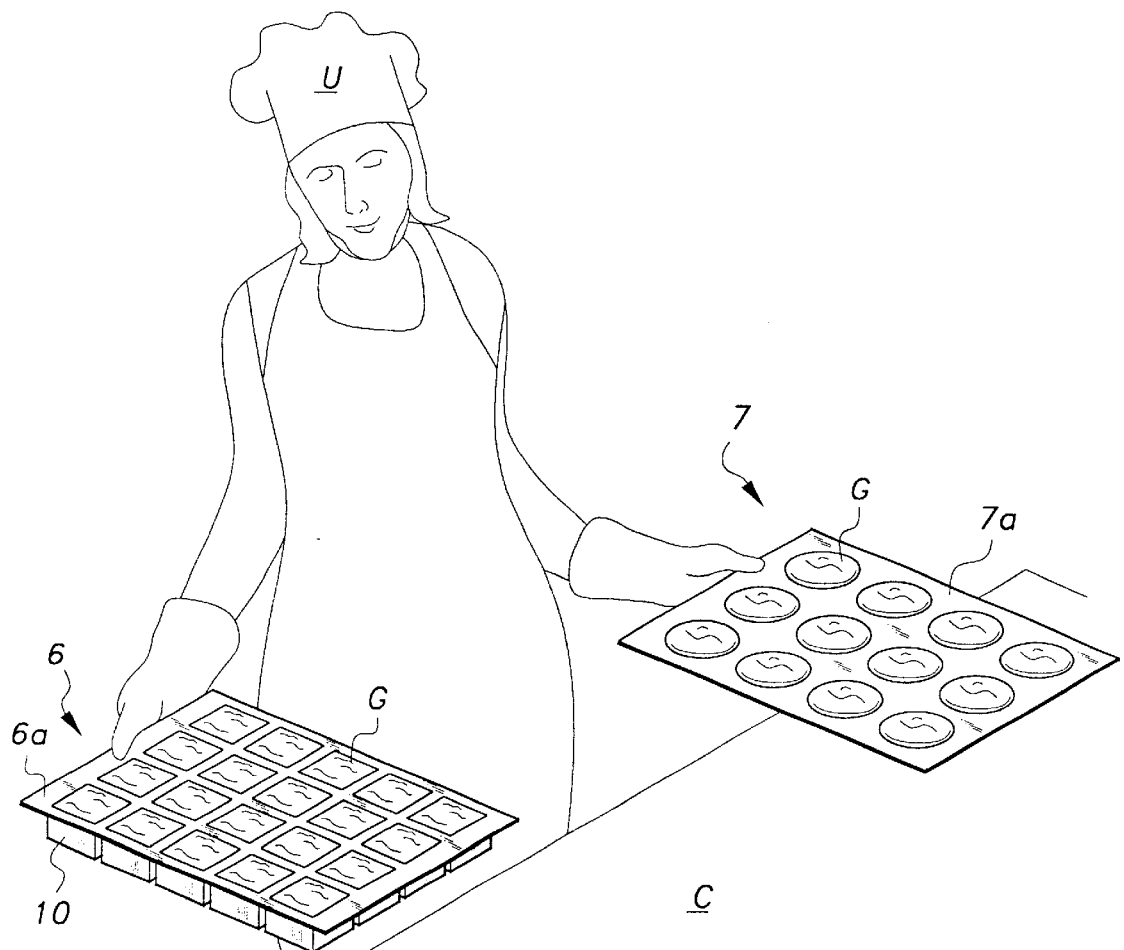
FIG. 1 is an environmental, perspective view of sectional baking pans according to the present invention.
Figure 2:
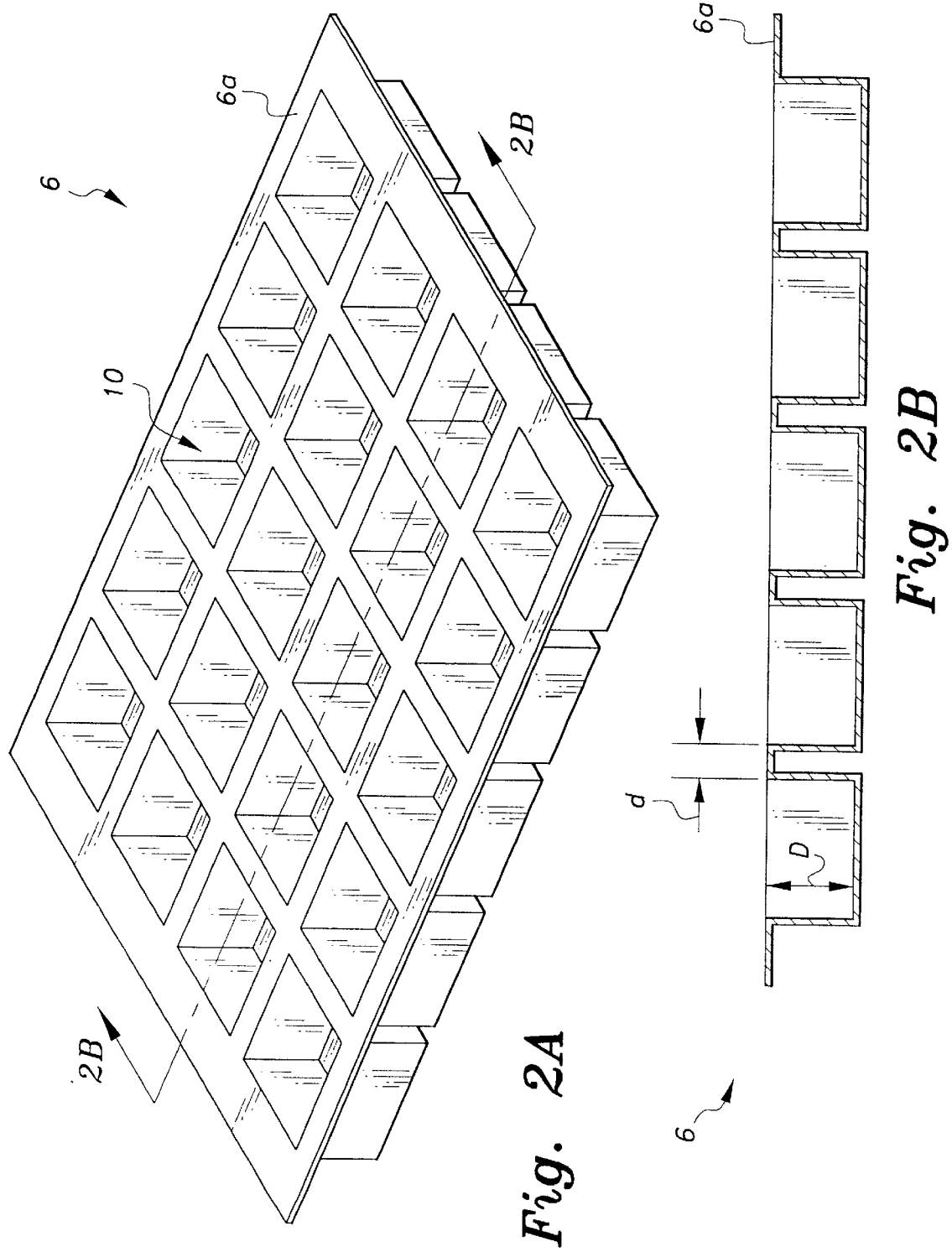
FIG. 2A is a perspective view of a sectional baking pan for brownies according to the invention.
FIG. 2B is a sectional view along lines 2B—2B of FIG. 2A, illustrating square cups with predetermined heating depths and heat separation distances between respective cups.

As best seen in FIGS. 1, 2A and 2B a user or baker U is shown handling first and second baking pans 6 and 7, respectively for delivering baked goods to a serving or cooling counter C. The first baking pan 6 is shown having an outer rim or flange portion 6a and a plurality of cups 10, which cups are shaped according to a predetermined geometric configuration. Each cup 10 of the first pan 6 is preferably square in shape and is designed to have a predetermined heating depth D of 1.25 inches, which depth ensures uniform heating of a batter-based goods G without localized heat or inconsistencies along peripheral edges of each respective cup 10. For optimum convective heat transfer, a total of twenty cups arranged in a four by five matrix of rows and columns and having a convective heat separation distance d of 0.5 inches between adjacent edges of each respective cup produces sufficient heat throughout pan 6 without heat localization. The cup size for a heating depth of 1.25 inches and for a convective heat separation distance of 0.5 inches is preferably 2 inches by 2 inches for brownies. This includes a pan size of 14 inches by 10.5 inches. As seen in FIG. 2B, there is no special contour or angle surface requirement for conductive heat transfer.

Figure 3:
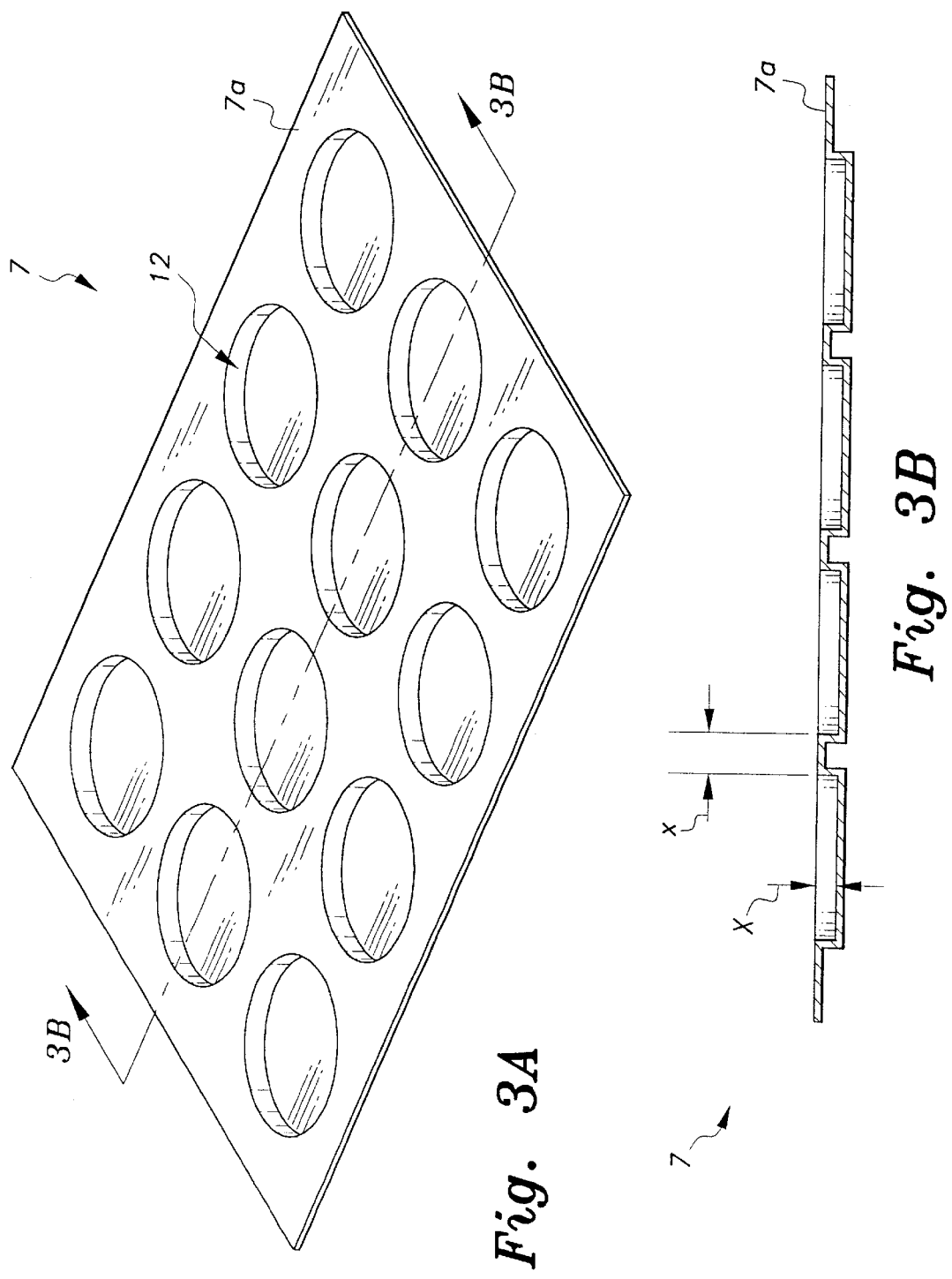
FIG. 3A is a perspective view of a sectional baking pan for cookies according to the invention.
FIG. 3B is a sectional view along lines 3B—3B of FIG. 3A, illustrating round cups with predetermined heating depths and heat separation distances between respective cups.

Attention is now directed to FIGS. 3A and 3B wherein a second baking pan 7 is shown having a plurality of cups 12 shaped preferably in the form of circles for baking cookies. It has been found that an optimum batter-based cookie product requires a pan having a matrix of twelve circular cups, each cup having a radius of 2.5 inches, a depth X of 0.25 inches and a convective heat transfer separation distance x of 0.5 inches. In order to include gripping edges or top flange end portions 7a for the cookie pan, the preferred cookie pan dimensions are preferably around 13.5 inches by 9.5 inches. As seen in FIG. 3B, there is no special contour or angle surface requirement for conductive heat transfer. Baking pans 6 and 7 are constructed of metal such as stainless steel, aluminum or an aluminum alloy which are coated with a non-stick surface coating such as tetrafluoroethylene or ceramic.

Figure 4:
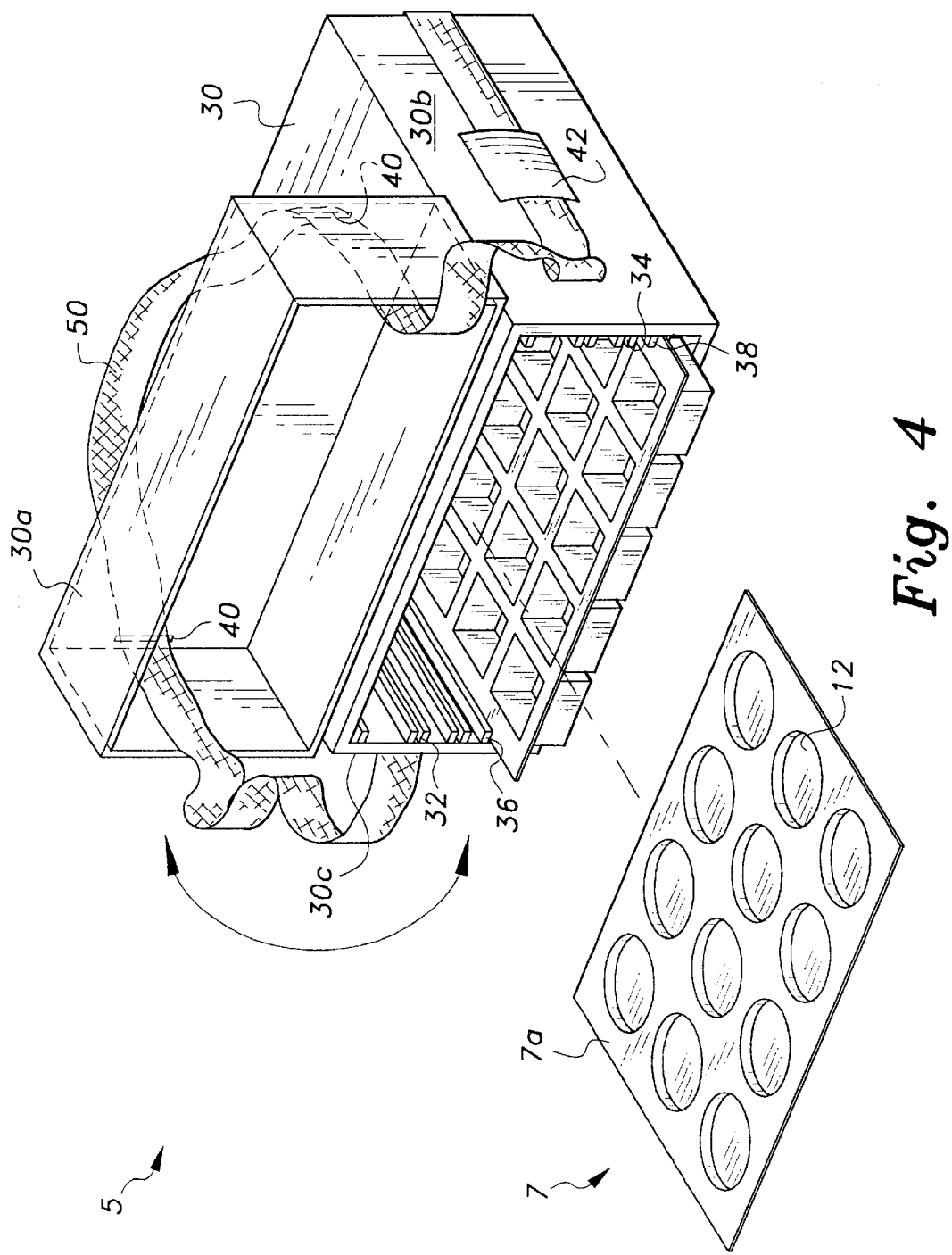
FIG. 4 is a perspective view of a sectional baking pan kit, illustrating a multilevel storage compartment for a plurality of baking pans.

As illustrated in FIG. 4, an insulated storage compartment 30 for storing and transporting the pans 6 and 7 has at least one first and second set of ledges 32,34 and 36,38 for retaining a plurality of baking pans via their respective flange end portions 6a and 7a for subsequent transport and delivery to various locations. The storage compartment 30 further comprises a carrying strap 50 which is slidably retained in a detachable lid 30a of the compartment 30 via a first and second substantially rectangular aperture 40. The strap 32 is also slidably retained within at least one protruding channel 42 on a first 30b and second surface portion 30c of the storage compartment 30 at opposing ends. The attachment of the strap 32 to the compartment 30 is made such that the carrying strap 32 encompasses the entire storage compartment. The strap 32 is preferably made of nylon or similar material.

It is to be understood that the present invention is not limited to the sole embodiments described above, but encompasses any and all embodiments within the scope of the following claims.

We claim:

1. An improved sectional pan baking kit, comprising:
    a first baking pan, said first baking pan having end portions;
    a first plurality of cups formed in said first baking pan, each cup of said first plurality having a peripheral edge, a predetermined geometric shape, a predetermined heating depth and a predetermined convective heat transfer separation distance;
    a first top flange, said first top flange disposed on said end portions of said first baking pan;
    a second baking pan, said second baking pan having end portions;
    a second plurality of cups formed in said second baking pan, each cup of said second plurality having a peripheral edge, a predetermined geometric shape, a predetermined heating depth and a predetermined convective heat transfer separation distance;
    a second top flange, said second top flange disposed on said end portions of said second baking pan;
    a storage compartment having an outer surface;
    a first set of ledges disposed in said compartment for supporting said first top flange of said first baking pan thereon; and
    a second set of ledges disposed in said compartment for supporting said second top flange of said second baking pan thereon.

2. The kit according to claim 1, wherein said storage compartment is insulated and wherein a carrying strap is attached to said outer surface.

3. The kit according to claim 2, wherein each cup of said first plurality of cups has a predetermined heat depth of 1.25 inches and a convective heat transfer separation distance of 0.5 inches between each respective peripheral edge.

4. The kit according to claim 3, wherein each cup of said second plurality of cups has a predetermined heat depth of 0.25 inches and a convective heat transfer separation distance of 0.5 inches between each respective peripheral edge.

5. The kit according to claim 4, wherein said first plurality of cups comprises twenty cups and each cup of said first plurality of cups is shaped as a 2 inch square.

6. The kit according to claim 5, wherein said second plurality of cups comprises twelve cups and each cup of said second plurality of cups is substantially circular having a 2.5 inch radius.

7. The kit according to claim 6, wherein said first and said second baking pans are fabricated from metal and include a non-stick surface coating.

8. The kit according to claim 7, wherein said metal is stainless steel.

9. The kit according to claim 7, wherein said metal is aluminum.

10. The kit according to claim 7, wherein said non-stick surface coating is a ceramic material.

11. The kit according to claim 10, wherein said metal is an aluminum alloy.

12. The kit according to claim 7, wherein said non-stick surface coating is tetrafluoroethylene.

13. An improved sectional pan baking kit, comprising:
    a first baking pan, said first baking pan having end portions;
    a first plurality of cups formed in said first baking pan, each cup of said first plurality having a peripheral edge, a predetermined geometric shape, a predetermined heating depth and a predetermined convective heat transfer separation distance;
    a first top flange, said first top flange disposed on said end portions of said first baking pan;
    a second baking pan, said second baking pan having end portions;
    a second plurality of cups formed in said second baking pan, each cup of said second plurality having a peripheral edge, a predetermined geometric shape, a predetermined heating depth and a predetermined convective heat transfer separation distance;
    a second top flange, said second top flange disposed on said end portions of said second baking pan;
    an insulated storage compartment, said storage compartment having an outer surface and a top portion;
    first and second apertures disposed in said top portion;
    channel members disposed on said outer surface of said storage compartment;
    a carrying strap, said carrying strap slidably retained in said first and second apertures and said channel members;
    a first set of ledges disposed in said compartment for supporting said first baking pan thereon; and
    a second set of ledges disposed in said compartment for supporting said second baking pan thereon.

14. The kit according to claim 13, wherein each cup of said first plurality of cups has a predetermined heat depth of 1.25 inches and a convective heat transfer separation distance of 0.5 inches between each respective peripheral edge.

15. The kit according to claim 14, wherein each cup of said second plurality of cups has a predetermined heat depth of 0.25 inches and a convective heat transfer separation distance of 0.5 inches between each respective peripheral edge.

16. The kit according to claim 15, wherein each cup of said first plurality of cups is shaped as a 2 inch square.

17. The kit according to claim 16, wherein each cup of said second plurality of cups is substantially circular having a 2.5 inch radius.

18. The kit according to claim 17, wherein said first and said second baking pans are fabricated from metal and include a non-stick surface coating.

\* \* \* \* \*